(12) United States Patent
Mohseni

(10) Patent No.: US 12,510,154 B2
(45) Date of Patent: Dec. 30, 2025

(54) LIGHT WEIGHT HYBRID PISTON SEAL RING

(71) Applicant: RTX Corporation, Farmington, CT (US)

(72) Inventor: Hamidreza Mohseni, Avon, CT (US)

(73) Assignee: RTX Corporation, Farmington, CT (US)

( * ) Notice: Subject to any disclaimer, the term of this patent is extended or adjusted under 35 U.S.C. 154(b) by 4 days.

(21) Appl. No.: 18/404,201

(22) Filed: Jan. 4, 2024

(65) Prior Publication Data

US 2025/0224034 A1 Jul. 10, 2025

(51) Int. Cl.
F16J 9/26 (2006.01)

(52) U.S. Cl.
CPC ........................................ *F16J 9/26* (2013.01)

(58) Field of Classification Search
CPC ..................... F16J 9/00; F16J 9/12; F16J 9/26
See application file for complete search history.

(56) References Cited

U.S. PATENT DOCUMENTS

| | | | |
|---|---|---|---|
| 4,226,429 A | 10/1980 | Sato et al. | |
| 5,316,321 A | 5/1994 | Ishida et al. | |
| 9,920,836 B2 | 3/2018 | Sasaki et al. | |
| 10,920,617 B2 | 2/2021 | Stoyanov et al. | |
| 11,149,651 B2 | 10/2021 | Stoyanov et al. | |
| 2018/0306120 A1* | 10/2018 | Shi | F16J 15/441 |
| 2019/0049012 A1* | 2/2019 | Svrcek | F16J 15/164 |
| 2019/0226585 A1* | 7/2019 | Snow | F01D 11/003 |
| 2020/0362966 A1* | 11/2020 | Svrcek | F16J 9/26 |
| 2022/0282631 A1* | 9/2022 | Maalouf | F01D 5/025 |
| 2023/0219859 A1* | 7/2023 | Nable | C04B 41/52 |
| | | | 106/14.05 |

FOREIGN PATENT DOCUMENTS

| | | |
|---|---|---|
| JP | H06235463 A | 8/1994 |
| WO | 2018015345 A1 | 1/2018 |

OTHER PUBLICATIONS

H. Singh et al., Tribological Performance and Coating Characteristics of Sputter-Deposited Ti-Doped MoS2 in Rolling and Sliding Contact, Tribology Transactions, vol. 58, Issue 5, Jul. 1, 2015, pp. 767-777, https://doi. org/10.1080/10402004.2015.1015758.
Extended European Search Report dated Apr. 23, 2025, issued in corresponding application EP25150125.0.

* cited by examiner

*Primary Examiner* — Gilbert Y Lee
(74) *Attorney, Agent, or Firm* — Bachman & LaPointe, P.C.

(57) ABSTRACT

A piston seal ring for sealing between an inner and an outer radial component includes a core having a shell, wherein the core includes a material selected from the group consisting of titanium alloy, titanium-based metal matrix, carbon-carbon composite, electro-graphitic carbon, ceramic matrix composite and combinations thereof, and wherein the shell includes a material selected from the group consisting of nickel alloy, cobalt alloy and combinations thereof.

17 Claims, 3 Drawing Sheets

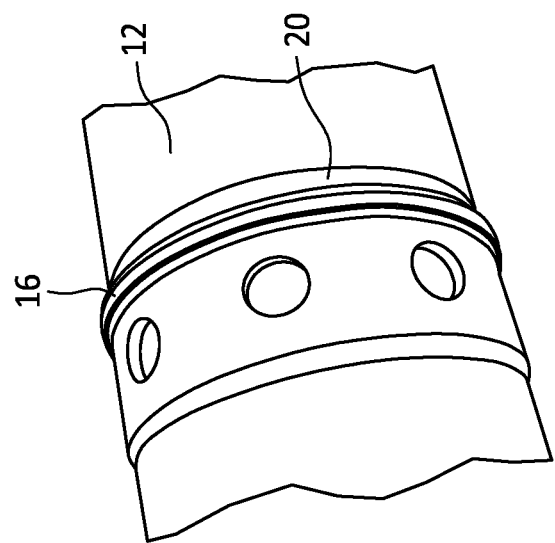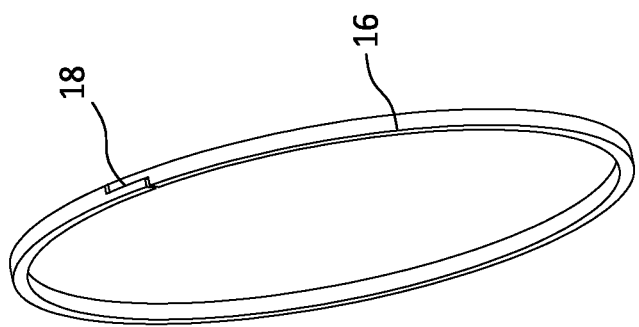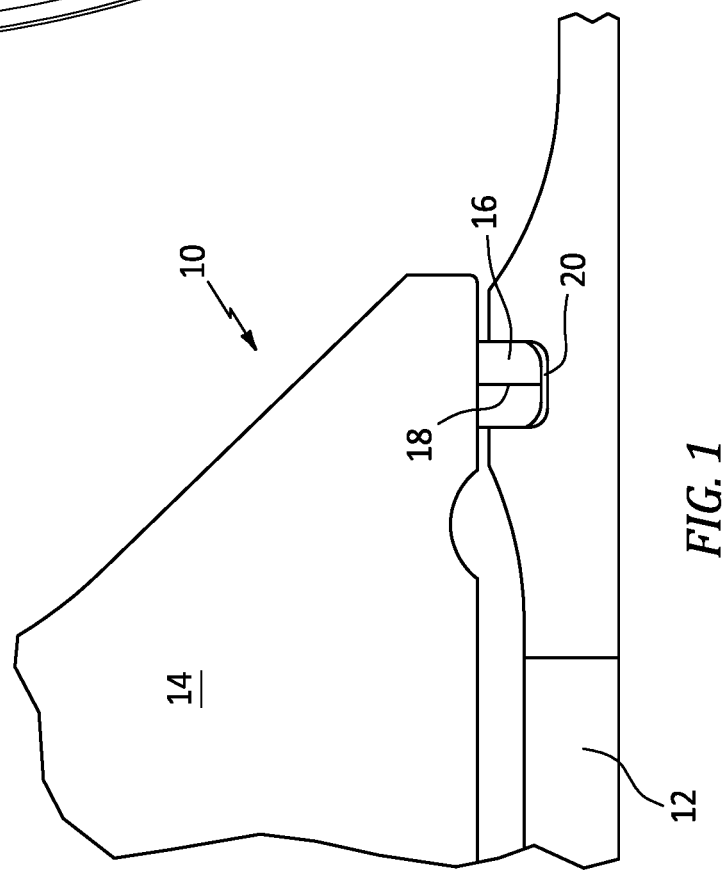

LIGHT WEIGHT HYBRID PISTON SEAL RING

FIELD

The present disclosure relates to piston seal rings useful in gas turbine engines, for example in compressors.

BACKGROUND

Turbomachinery such as gas turbine engines frequently have components that require seals to prevent leakage therebetween. One non-limiting example of such components is with respect to compressors wherein a rotor is mounted to a shaft with a piston seal ring disposed between them to prevent leakage through the interface where rotor meets shaft. By way of further non-limiting example, a high-pressure compressor typically known as a #6 high pressure compressor can have a tie shaft, a rotor such as an integrated blade rotor on the shaft, and a piston seal ring between the tie shaft and the rotor.

During operation, such a compressor can hit very high rates of rotation, for example of about as high as about 30,000 rpm. This leads to portions of the components, for example a radially inwardly facing surface of the rotor, to be subjected to wear mechanisms, dominantly, severe adhesive (galling) and impact wear and when the radial displacement is combined with axial displacement, 2 and/or 3-body abrasive, and fretting wear are common active wear mechanisms seen on the forward and aft faces of the piston seal ring and groove walls on the tie shaft

SUMMARY OF THE DISCLOSURE

In one non-limiting embodiment, a piston seal ring for sealing between an inner and an outer radial component comprises a core having a shell, wherein the core comprises a material selected from the group consisting of titanium alloy, titanium-based metal matrix, carbon-carbon composite, electro-graphitic carbon, ceramic matrix composite and combinations thereof, and wherein the shell comprises a material selected from the group consisting of nickel alloy, cobalt alloy and combinations thereof.

In a non-limiting configuration, the core comprises a material selected from the group consisting of titanium alloy, titanium-based metal matrix composite and combinations thereof, and the shell comprises nickel alloy.

In another non-limiting configuration, the core comprises a material selected from the group consisting of titanium alloy, titanium-based metal matrix composite and combinations thereof, and the shell comprises cobalt alloy.

In still another non-limiting configuration, the piston seal ring further comprises a solid lubricant thin film or coating on the shell.

In a further non-limiting configuration, the solid lubricant thin film or coating is selected from the group consisting of graphite, amorphous carbon, ultra nanocrystalline diamond, diamond-like carbon coatings, $MoS_2$, physical vapor deposited $MoS_2$, $WS_2$, $Sb_2O_3$, and combinations thereof.

In a still further non-limiting configuration, the core comprises a material selected from the group consisting of carbon-carbon composite, electro-graphitic carbon, ceramic matrix composite and combinations thereof.

In another non-limiting configuration, the shell comprises a material selected from the group consisting of nickel alloy, cobalt alloy and combinations thereof.

In still another non-limiting configuration, the piston seal ring has an outer radial surface, and the shell defines the outer radial surface.

In a further non-limiting configuration, the shell has a thickness of between 10 mils and 150 mils.

In a still further non-limiting configuration, the core comprises between 25 and 75% (vol) of the piston seal ring.

In another non-limiting configuration, the core comprises a radially inner portion of the piston seal ring, and the shell comprises a radially outer portion of the piston seal ring, and further comprising a composition gradient from the core to the shell.

In still another non-limiting configuration, the composition gradient changes from all core material at the radially inner portion of the piston seal ring to all shell material at the radially outer portion of the seal ring.

In another embodiment, a seal ring assembly for a compressor of a gas turbine engine, comprises a shaft; a piston seal ring around the shaft; and a rotor borefoot disposed around the shaft for rotation with the shaft, wherein the piston seal ring is between the shaft and the rotor borefoot, and wherein the piston seal ring comprises a piston seal ring as disclosed herein.

In a non-limiting configuration, the shaft comprises a radially outwardly facing groove, and wherein the piston seal ring is mounted in the radially outwardly facing groove.

In another non-limiting configuration, the shell of the piston seal ring contacts the rotor borefoot.

In still another non-limiting configuration, the shaft and the rotor borefoot rotate together such that a seal interface between the piston seal ring, the shaft and the rotor borefoot is a static seal interface.

In another non-limiting embodiment, a method for making a piston seal ring, comprises forming a core of the piston seal ring from a material selected from the group consisting of titanium alloy, titanium-based metal matrix, carbon-carbon composite, electro-graphitic carbon, ceramic matrix composite and combinations thereof, and forming a shell on the core, wherein the shell comprises a material selected from the group consisting of nickel alloy, cobalt alloy and combinations thereof, and wherein the shell defines a radially outer facing surface of the piston seal ring.

In a non-limiting configuration, the core is formed as a continuous ring, and the shell is formed around the ring so as to define an entire outer surface of the piston seal ring.

In another non-limiting configuration, the core is formed defining a radially inwardly facing surface of the piston seal ring, and the shell is formed defining a radially outwardly facing surface of the piston seal ring, and further comprising generating a gradient from the core to the shell.

In still another non-limiting configuration, the forming steps comprise manufacturing steps selected from the group consisting of additive manufacturing, spark plasma sintering, powder metallurgy and combinations thereof.

The foregoing features and elements may be combined in various combinations without exclusivity, unless expressly indicated otherwise. These features and elements, as well as the operation thereof, will become more apparent in light of the following description and the accompanying drawings. It should be appreciated that the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 1 schematically illustrates a non-limiting example of a seal assembly for compressor of a gas turbine engine;

FIG. 2 is a schematic illustration of a piston seal ring;

FIG. 3 illustrates a shaft with piston seal ring;

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option. Further, any steps in a method discussed herein may be performed in any suitable order or combination. Additionally, any reference to without contact (or similar phrases) may also include reduced contact or minimal contact. It should also be understood that unless specifically stated otherwise, references to "a", "an", or "the" may include one or more than one and that reference to an item in the singular may also include the item in the plural. Further, all ranges may include upper and lower values and all ranges and ratio limits disclosed herein may be combined.

This disclosure relates to a seal assembly for turbomachinery such as a gas turbine engine. In one non-limiting embodiment, the seal assembly is for components of a compressor, for example a high pressure compressor. These components can be the shaft or tie shaft that rotates with components of the gas turbine engine, and a rotor mounted to the shaft. A seal such a piston seal ring is positioned between the shaft and the rotor.

Figure 7:
FIG. 7 schematically illustrates wear that can occur to a radially inner surface of a rotor component with known piston seal rings.

FIG. 1 schematically illustrates a seal assembly 10 including a tie shaft 12, a rotor borefoot 14 and a piston seal ring 16 between the tie shaft 12 and the borefoot 14. As shown, piston seal ring 16 can be mounted in a radially outwardly opening groove 18 of tie shaft 12 to hold piston seal ring 16 in place to seal against a radially inner surface of borefoot 14. During operation of the gas turbine engine, shaft 12 and rotor 14 can rotate at very high speeds, for example as much as 30,000 rpm or more. This leads to contact stress at the points of contact between the piston seal ring and the radially inwardly facing surface of the borefoot. This contact stress can be due in large part to the large centrifugal forces exerted by the piston seal ring against the radially inwardly facing surface of the borefoot. In FIG. 7, the upper view schematically illustrates a portion of the radially inwardly facing surface of the borefoot, and substantial wear can be seen. The lower view of FIG. 7 shows corresponding structure of a piston seal ring. In examples, the rotor borefoot after a certain amount of use or engine operation cycles has shown wear scars in the radial, circumferential and axial directions corresponding to the piston seal ring structure.

FIG. 2 shows one embodiment of piston seal ring 16 shown as a full hoop structure that can be joined into the ring shape with interlocking structure 18. In this configuration, piston seal ring 16 can be formed in an open configuration or even a straight component and then shaped into a ring and the ends joined at interlocking structure 18. In this regard, it should be noted that the sectional view of FIG. 1 is taken through interlocking structure 18, the dividing line between structures can be seen.

FIG. 3 shows a section of shaft 12 with piston seal ring 16 mounted therein, in this case in a radially outwardly facing groove 20 which is also illustrated in FIG. 1.

Known piston seal rings are typically made from cobalt-based alloy such as cobalt-based, chromium-tungsten alloy. Such material is used extensively in wear environments, but in the present case, it has been found that the weight of this and similar materials coupled with the large centrifugal force created by the high rate of rotation of the shaft leads to a high contact stress with the radially inwardly facing surfaces of borefoot 14 that results in undesirable severe wear and damage. Specifically, known piston seal rings can also have two coatings on the outer diameter, e.g., copper-aluminum coating and dry-film lubricant topcoat. As the number of operation cycles increases, the dry-film lubricant is removed and the Cu—Al coating wears out. Hardware investigations revealed the above-discussed wear mechanisms were present at the interface of the piston seal ring and rotor borefoot, including severe adhesive (galling) and impact wear and in the axial direction 2- and/or 3-body abrasive and fretting wear are present. These issues are schematically illustrated in FIG. 7.

Figure 6:
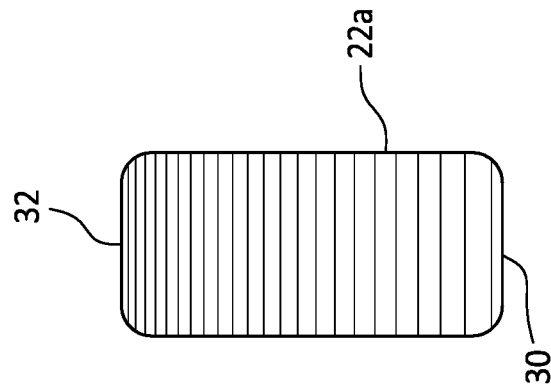
FIG. 6 is a cross section taken through a piston seal ring in accordance with another non-limiting embodiment.
Figure 5:
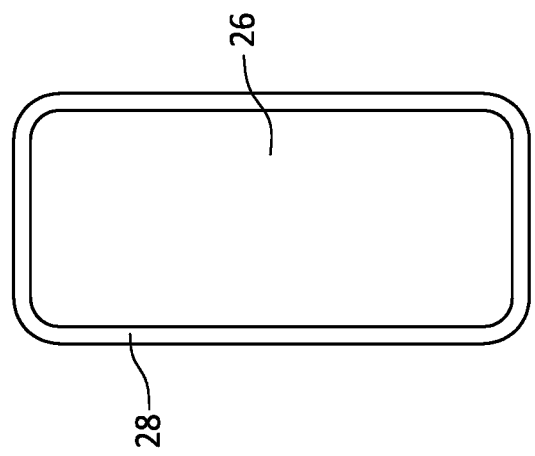
FIG. 5 is a cross section taken through a piston seal ring in accordance with a non-limiting embodiment.
Figure 4:
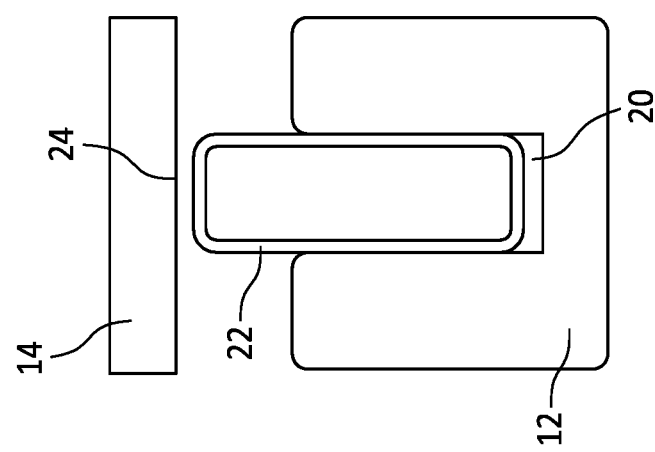
FIG. 4 is a schematic cross section taken through a shaft, piston seal ring and rotor component in accordance with one non-limiting embodiment.

FIGS. 4-6 illustrate examples of hybrid piston seal rings 22 which are constructed to have less weight than piston seal rings made from, for example, cobalt-based alloy, and still have good wear surfaces in contact with the borefoot. FIG. 4, for example, shows a cross section through a seal assembly wherein hybrid piston seal ring 22 is in a groove 20 of shaft 12 and contacts a radially inward surface 24 of borefoot 14. As shown also in FIG. 5, piston seal ring 22 in this embodiment has a core 26 and a shell 28. Core 26 is fabricated of materials selected to reduce the weight of the piston seal ring, while shell 28 is fabricated of materials selected to interact well with surface 24 of borefoot 14.

In the embodiments disclosed herein, the piston seal ring is fabricated from materials that are lighter in weight than materials typically used for making piston seal rings. This reduces the contact stress exerted by the piston seal ring on the radially inwardly facing surface of the borefoot, for example to less than 5 ksi during typical steady-state wear test conditions. During normal operation of the compressor, higher contact stresses can be experienced, but only momentarily, not as a steady-state condition. This reduction of contact stress can help to significantly reduce wear.

One non-limiting combination of materials for a hybrid piston seal ring include a Ti alloy core (e.g., Ti-6-2-4-2, Ti-6-4, etc.) or Ti based metal matrix composite core, with the shell being fabricated from Ni alloy (e.g., IN718, waspaloy, Mar-m-247). The core and shell can be fabricated as shown in FIGS. 4 and 5, or can be fabricated into a functionally graded composition having a composition gradient as shown in FIG. 6 discussed further below.

Another non-limiting combination of materials for the disclosed hybrid piston seal ring can include a Ti alloy core (e.g., Ti-6-2-4-2, or Ti-6-4), or Ti based metal matrix composite core, with the shell being fabricated from Co alloy (e.g., stellite 6B).

Still another non-limiting combination of materials includes carbon-carbon composite core, electro-graphitic carbon core, or ceramic matrix composite core, with the shell fabricated from Ni alloy (e.g., IN718, waspaloy, Mar-m-247) Co alloy (e.g., stellite 6B). Further, since a carbon-carbon composite, as well as other possible candidate materials, has intrinsic porosity, such porosity can be infiltrated with a secondary material such as nickel or cobalt based alloys.

Thus, the materials for core and shell can generally include the core comprising a material selected from the group consisting of titanium alloy, titanium-based metal matrix composite and combinations thereof, and the shell can comprise nickel alloy, cobalt alloy and combinations thereof.

For any of the identified combinations of materials wherein the shell material includes cobalt and nickel alloys, solid lubricant thin films or coatings that reduce friction and wear can be applied on top of the shell to reduce friction and wear and avoid premature failure due to seizure and galling. Examples of solid lubricant and wear resistant materials, coatings and thin films include: graphite, amorphous carbon, ultra nanocrystalline diamond, diamond-like carbon (DLC) coatings with high temperature capability, $MoS_2$, physical vapor deposited (PVD) $MoS_2$, $WS_2$, $Sb_2O_3$ and combination of various solid lubricant phases in multi-layer, multi-components, or adaptive composite coatings. When applying $MoS_2$ by PVD, it may be desirable to dope with elements such as titanium or the like which can provided enhanced friction and wear properties.

In one non-limiting configuration, shell 28 can have a thickness of between 10 mils and 150 mils. In further configurations, the shell can have a thickness of between 10 mils and 100 mils. This can serve to provide sufficient wear resistance to the surface of the piston seal ring that is in contact with the borefoot. Further, in another on-limiting configuration, the core can comprise at least 25% (vol), for example between 25 and 75% (vol), of the piston seal ring. This can serve to provide a desired reduction in overall density or mass of the piston seal ring, and thereby decrease the contact stress applied to the borefoot, specifically the radially inwardly facing surface of the borefoot, during operation of the gas turbine engine.

A finishing treatment can be applied to the surface of the piston seal ring as disclosed herein. For example, proposed surface finishes can include electropolish, laser surface patterning and burnish or coat with dry-film lubricant $MoS_2$ based, graphite based, or other combinations such as $MoS_2$+ graphite+$Sb_2O_3$.

Further, shot peening can be used to enhance fretting and galling wear resistance. Then, coating with dry-film lubricant $MoS_2$ based, graphite based, or other combinations like $MoS_2$+graphite+$Sb_2O_3$ can be done.

Low friction and wear resistant hybrid piston seal rings as disclosed herein for the HPC rotor operate with higher efficiency at wide range of temperatures and environments. Enhanced sealing provides higher endurance and reliability for engine components, and this in turn may significantly reduce engine overhaul cost.

As discussed in connection with FIGS. 4-6, piston seal ring 22 can be fabricated as a core 26 having a shell 28 as shown in FIG. 5, or can be fabricated with a composition gradient as shown in FIG. 6. Different manufacturing techniques can be used to form these two different structures. In one non-limiting configuration, additive manufacturing can be used to make the piston seal ring. Non-limiting examples of additive manufacturing (AM) methods include selective laser melting (SLM), SLM combined with cold spray (CS), which is known as a hybrid additive manufacturing process.

In addition, electron beam melting (EBM) combined with hot isostatic pressing (HIP) can be used.

Note that the atmosphere for any of the abovementioned additive and hybrid methods can be important to prevent formation of undesirable oxides and compounds during deposition. Further, a controlled environment to deposit the outermost layers facilitates integration of solid-lubricant oxides, carbides, or nitride hard coating to enhance the wear resistance and reduce friction.

Non-limiting examples of non-additive manufacturing methods include spark plasma sintering (SPS), powder metallurgy (P/M) routes and the like.

Returning to FIG. 6, in this illustration, a non-limiting configuration is presented wherein a piston seal ring 22a having a composition gradient is illustrated. This gradient can run from core material at a radially inwardly facing surface 30 to shell material at a radially outwardly facing surface 32 as shown. This can be advantageous as the shell material is positioned to contact the borefoot as desired, while the core material is positioned radially inwardly where the reduced weight materials can reduce the contact stress without impacting the mechanical interaction of the piston seal ring with the borefoot.

In another non-limiting configuration of this disclosure, a method for making the piston seal ring disclosed herein is also provided. This method involves forming a core of the piston seal ring for example from a material selected from the group consisting of titanium alloy, titanium-based metal matrix, carbon-carbon composite, electro-graphitic carbon, ceramic matrix composite and combinations thereof. Then, a shell can be formed on the core, wherein the shell comprises a material selected from the group consisting of nickel alloy, cobalt alloy and combinations thereof. The shell is formed so as to define a radially outer facing surface of the piston seal ring. The core is formed as a continuous ring, and the shell can be formed around the ring so as to define an entire outer surface of the piston seal ring.

The core can be formed defining a radially inwardly facing surface of the piston seal ring, and the shell is formed defining a radially outwardly facing surface of the piston seal ring, and further comprising generating a gradient from the core to the shell.

In one non-limiting configuration, the forming steps can comprise manufacturing steps selected from the group consisting of additive manufacturing, spark plasma sintering, powder metallurgy and combinations thereof.

It should be appreciated that in one simple execution of the method, the result can be the piston seal ring as shown, for example, in FIG. 5 wherein the shell completely surrounds the core. Alternatively, and as discussed above, a piston seal ring as shown in FIG. 6 can be fabricated by starting with core material at a radially inward portion of the piston seal ring, and shifting from core material to shell material to create a gradient as shown, provide shell material at the radially outwardly facing surface of the piston seal ring. In either case, it should be appreciated that the lighter core material constitutes at least 25% (vol) and in one non-limiting configuration between 25 and 75% (vol) of the overall piston seal ring, which can serve to significantly reduce the contact stress experienced by the borefoot during operation of the gas turbine engine. In configurations the corresponding amount of the shell in the piston seal ring can be between 75% and 25% (vol) of the overall piston seal ring.

The foregoing description is exemplary of the subject matter of the subject matter disclosed herein. Various non-limiting embodiments are disclosed, however, one of ordinary skill in the art would recognize that various modifications and variations in light of the above teachings will fall within the scope of the appended claims. It is therefore to be appreciated that within the scope of the appended claims, the disclosure may be practiced other than as specifically described. Thus, the scope of the present claims is not specifically limited by the details of specific embodiment disclosed herein, but rather the claims define the full and reasonable scope of the disclosure.

I claim:

1. A piston seal ring for sealing between an inner and an outer radial component, comprising:
   a core having a shell, wherein the core comprises a material selected from the group consisting of titanium alloy, titanium-based metal matrix, carbon-carbon composite, electro-graphitic carbon, ceramic matrix composite and combinations thereof, and wherein the shell comprises a material selected from the group consisting of nickel alloy, cobalt alloy and combinations thereof, wherein the core comprises a radially inner portion of the piston seal ring, and the shell comprises a radially outer portion of the piston seal ring, and further comprising a composition gradient from the core to the shell, and wherein the composition gradient changes from all core material at the radially inner portion of the piston seal ring to all shell material at the radially outer portion of the seal ring.

2. The piston seal ring of claim 1, wherein the core comprises a material selected from the group consisting of titanium alloy, titanium-based metal matrix composite and combinations thereof, and the shell comprises nickel alloy.

3. The piston seal ring of claim 1, wherein the core comprises a material selected from the group consisting of titanium alloy, titanium-based metal matrix composite and combinations thereof, and the shell comprises cobalt alloy.

4. The piston seal ring of claim 1, further comprising a solid lubricant thin film or coating on the shell.

5. The piston seal ring of claim 4, wherein the solid lubricant thin film or coating is selected from the group consisting of graphite, amorphous carbon, ultra nanocrystalline diamond, diamond-like carbon coatings, $MoS_2$, physical vapor deposited $MoS_2$, $WS_2$, $Sb_2O_3$, and combinations thereof.

6. The piston seal ring of claim 1, wherein the core comprises a material selected from the group consisting of carbon-carbon composite, electro-graphitic carbon, ceramic matrix composite and combinations thereof.

7. The piston seal ring of claim 6, wherein the shell comprises a material selected from the group consisting of nickel alloy, cobalt alloy and combinations thereof.

8. The piston seal ring of claim 1, wherein the piston seal ring has an outer radial surface, and wherein the shell defines the outer radial surface.

9. The piston seal ring of claim 1, wherein the shell has a thickness of between 10 mils and 150 mils.

10. The piston seal ring of claim 1, wherein the core comprises between 25 and 75% (vol), of the piston seal ring.

11. A seal ring assembly for a compressor of a gas turbine engine, comprising:
    a shaft;
    a piston seal ring around the shaft; and
    a rotor borefoot disposed around the shaft for rotation with the shaft, wherein the piston seal ring is between the shaft and the rotor borefoot, and wherein the piston seal ring comprises a piston seal ring according to claim 1.

12. The seal ring assembly of claim 11, wherein the shaft comprises a radially outwardly facing groove, and wherein the piston seal ring is mounted in the radially outwardly facing groove.

13. The seal ring assembly of claim 11, wherein the shell of the piston seal ring contacts the rotor borefoot.

14. The seal ring assembly of claim 11, wherein the shaft and the rotor borefoot rotate together such that a seal interface between the piston seal ring, the shaft and the rotor borefoot is a static seal interface.

15. A method for making a piston seal ring, comprising the steps of:
    forming a core of the piston seal ring from a material selected from the group consisting of titanium alloy, titanium-based metal matrix, carbon-carbon composite, electro-graphitic carbon, ceramic matrix composite and combinations thereof, and
    forming a shell on the core, wherein the shell comprises a material selected from the group consisting of nickel alloy, cobalt alloy and combinations thereof, and wherein the shell defines a radially outer facing surface of the piston seal ring, wherein the core is formed defining a radially inwardly facing surface of the piston seal ring, and the shell is formed defining a radially outwardly facing surface of the piston seal ring, and further comprising generating a gradient from the core to the shell, wherein the composition gradient changes from all core material at the radially inner portion of the piston seal ring to all shell material at the radially outer portion of the seal ring.

16. The method of claim 15, wherein the core is formed as a continuous ring, and wherein the shell is formed around the ring so as to define an entire outer surface of the piston seal ring.

17. The method of claim 15, wherein the forming steps comprise manufacturing steps selected from the group consisting of additive manufacturing, spark plasma sintering, powder metallurgy and combinations thereof.

* * * * *